United States Patent [19]
Conroy et al.

[11] Patent Number: 5,270,105
[45] Date of Patent: Dec. 14, 1993

[54] FIREPROOF BARRIER SYSTEM FOR COMPOSITE STRUCTURE

[75] Inventors: Patrick D. Conroy, Bowie; Usman A. Sorathia, Arnold, both of Md.

[73] Assignee: The United States of America as represented by the Secretary of the Navy, Washington, D.C.

[21] Appl. No.: 947,592

[22] Filed: Sep. 21, 1992

[51] Int. Cl.$^5$ ................................. B32B 7/00
[52] U.S. Cl. .................... 428/278; 428/436; 428/524; 428/920; 428/921
[58] Field of Search ............... 428/436, 524, 278, 920, 428/921, 902

[56] References Cited

U.S. PATENT DOCUMENTS

| | | | |
|---|---|---|---|
| 4,594,368 | 6/1986 | Salyer et al. | 428/524 |
| 4,652,476 | 3/1987 | Hromaey | 428/920 |
| 4,732,804 | 3/1988 | Hujas | 428/265 |
| 5,058,342 | 10/1991 | Crompton | 428/524 |

*Primary Examiner*—James J. Bell
*Attorney, Agent, or Firm*—Charles Miller

[57] ABSTRACT

A fireproof barrier system for a composite structure is provided. A sheet of ablative material is bonded onto the composite structure to be fireproofed. A protective phenolic resin skin is deposited on the sheet to protect the ablative material from handling and water damage while further improving the fire performance of the system. The protective skin may have between about 50 to 80 parts per hundred of aluminum trihydrate mixed therein. The protective phenolic resin skin may further be glass-reinforced.

9 Claims, 1 Drawing Sheet

FIREPROOF BARRIER SYSTEM FOR COMPOSITE STRUCTURE

The invention described herein may be manufactured and used by or for the Government of the United States of America for governmental purposes without payment of any royalties thereon or therefor.

FIELD OF THE INVENTION

The invention relates generally to fire protection of composite structures, and more particularly to a fireproof barrier system for composite structures.

BACKGROUND OF THE INVENTION

Use of composite materials as structural components for the marine and aerospace industries dates back to the 1940's. Typically, the composite materials are vinylester, polyester or epoxy resin based, and may further be glass-reinforced. While choice of a particular composite is dictated by application, generally any one of the composites is the optimal choice with respect to strength, weight, cost, etc., when compared with other materials (e.g., metal, wood, etc.).

Unfortunately, experience has shown that most organic matrix materials, particularly the conventional polyester and epoxy types, support combustion and generate large quantities of smoke when burning. It has thus become necessary to place restrictions on using such materials in certain applications until such time that these materials can offer improved fire performance. Towards this end, various fire protection coatings have been developed. Most serve as a sacrificial fire barrier formed on the individual, composite material structure components and generally afford less than 20 minutes of fire protection.

SUMMARY OF THE INVENTION

Accordingly, it is an object of the present invention to provide a fireproof barrier for a composite material structure that improves its fire performance in terms of structural integrity, survivability and smoke/gas emissions.

It is a further object of the present invention to provide a fireproof barrier for a composite material structure that can withstand normal use and handling in a marine environment.

Still another object of the present invention is to provide a low maintenance solution to the problem of fire protection for a composite material structure.

Other objects and advantages of the present invention will become more obvious hereinafter in the specification and drawings.

In accordance with the present invention, a fireproof barrier system for a composite structure is provided. A sheet of ablative material is bonded onto the composite structure to be fireproofed. The sheet is between about 1-7 mm thick. A protective phenolic resin skin is deposited on the sheet to protect the ablative material sheet from handling and water damage. The protective skin may have between about 50 to 80 parts per hundred of aluminum trihydrate mixed therein. The protective phenolic resin skin may further be glass-reinforced.

DETAILED DESCRIPTION OF THE INVENTION

In order to provide a fireproof barrier for a structure built of composite (or any other) materials, the barrier must achieve the desired fire performance standards and maintain its structural integrity during normal handling and use as well as when it is exposed to fire. The description to follow discloses such a fireproof barrier for a structure made of, for example, a composite material. In general, the present invention will be described as a fireproof barrier for a composite material such as a vinylester, polyester or epoxy resin based composite, any of which may be further glass-reinforced. However, it is to be understood that the present invention may further be used on other structural materials as a fireproof barrier system.

Figure 1:
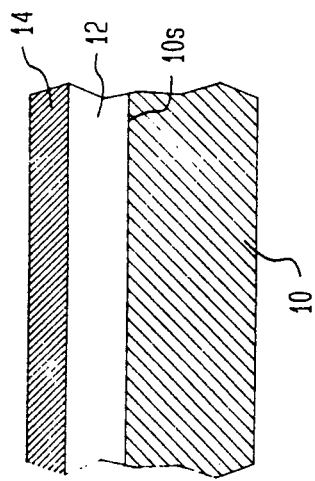
FIG. 1 is a cross-sectional view of the fireproof barrier system according to the present invention as it is applied to a structural component.

Referring now to the drawings, and more particularly to FIG. 1, the surface 10s (or surfaces if more than one side is to be fire protected) of the composite material 10 to be fireproofed is covered with a layer 12 of an ablative material. When exposed to extreme heat or fire, the ablative material gives off water in an endothermic reaction. An ablative material is typically formed from a binder material with an ablative component mixed therein. For the preferred embodiment, the binder is polyisobutylene and the ablative component is hydrated salts. One such ablative material is commercially available as "APM-F" from Development Products, Inc., Pennsauken, N.J.

Thickness of the ablative material is directly related to fire protection in terms of time. It has been found experimentally that a 1-2 mm thickness of the preferred embodiment ablative material prevents fire damage to an underlying structure for up to 20 minutes, and that a 6-7 mm thickness prevents fire damage in excess of one-half hour. Furthermore, ablative materials based on polyisobutylene binders are available in rubber-like sheets which, when used in thicknesses ranging from approximately 1-7 mm, easily conform to complex, non-linear structural surfaces. The method of applying and adhering the ablative material to a structural surface is not a constraint on the present invention. However, by way of a non-limiting example, one method is to bond the ablative material to the composite material with a high temperature epoxy adhesive such as Duralco 4525 manufactured by Cotronics Corporation, Brooklyn, N.Y.

In order to protect the ablative material layer 12 from handling damage, and further seal layer 12 against water/moisture damage, a phenolic resin skin or coating 14 is deposited (e.g. bonded, hand laid or sprayed) as shown on the surface of the ablative material that is exposed. The phenolic resin provides non-structural surface protection and offers good smoke and flame performance in the event of a fire. Since the phenolic resin is used in a non-structural role, it need only exist as a skin on the order of about 1-3 mm thick. The phenolic resin may further be glass-reinforced for extra strength as needed. The choice of a particular phenolic resin is not a constraint on the present invention. Typically, however, a phenolic resin that cures at room temperature is chosen because fireproofing of large or assembled structures prohibits the use of curing ovens. Several room temperature cure phenolic resins are commercially available. Acceptable choices include "350D66" manufactured by Georgia Pacific, Atlanta, Ga.; "Mark V" manufactured by ATS Products, Inc., San Francisco, Calif.; and "FIREPRF2" manufactured by Indspec, Inc., Pittsburgh, Pa. Finally, aluminum trihydrate may be mixed with the phenolic resin to further enhance the fire protection the phenolic resin skin layer. Experimental results have revealed that approximately 50-80 parts per hundred of aluminum trihydrate yield an improved fire protection.

In order to provide a more clear understanding of the advantages of the instant invention, five panel constructions were subjected to ignitability tests as set forth by specific test standards of the American Society for Testing and Materials (ASTM). The specific test is known as the "Heat Release Rate Using an Oxygen Consumption Cone Calorimeter", the specifications of which are set out in detail in ASTM E-1354. Briefly, ignitability is defined as the ease with which a material ignites. The lower the applied radiant heat flux, the longer the time before ignition. Thus, for a given radiant heat flux, a longer time to ignition is desirable.

The above described fireproof barrier design was tested for heat release rates in a cone calorimeter. The base composite for panels 1, 2, 4 and 5 was a 5 mm thick glass/epoxy composite panel and the ablative material used was the commercially available APM-F. The panel constructions tested included:

1) the base composite by itself;

2) the base composite with a 2 mm sheet of ablative material adhesively bonded thereto;

3) a 2 mm sheet of ablative material by itself;

4) the base composite with a 2 mm sheet of ablative material adhesively bonded thereto, and further having a 1 mm glass reinforced phenolic surface applied thereon; and 5) the base composite with a 2 mm sheet of ablative material adhesively bonded thereto, and further having a 1 mm glass reinforced phenolic with aluminum trihydrate mixed therein at a concentration of 80 parts per hundred, which was then applied thereon as a surface skin.

Figure 2:
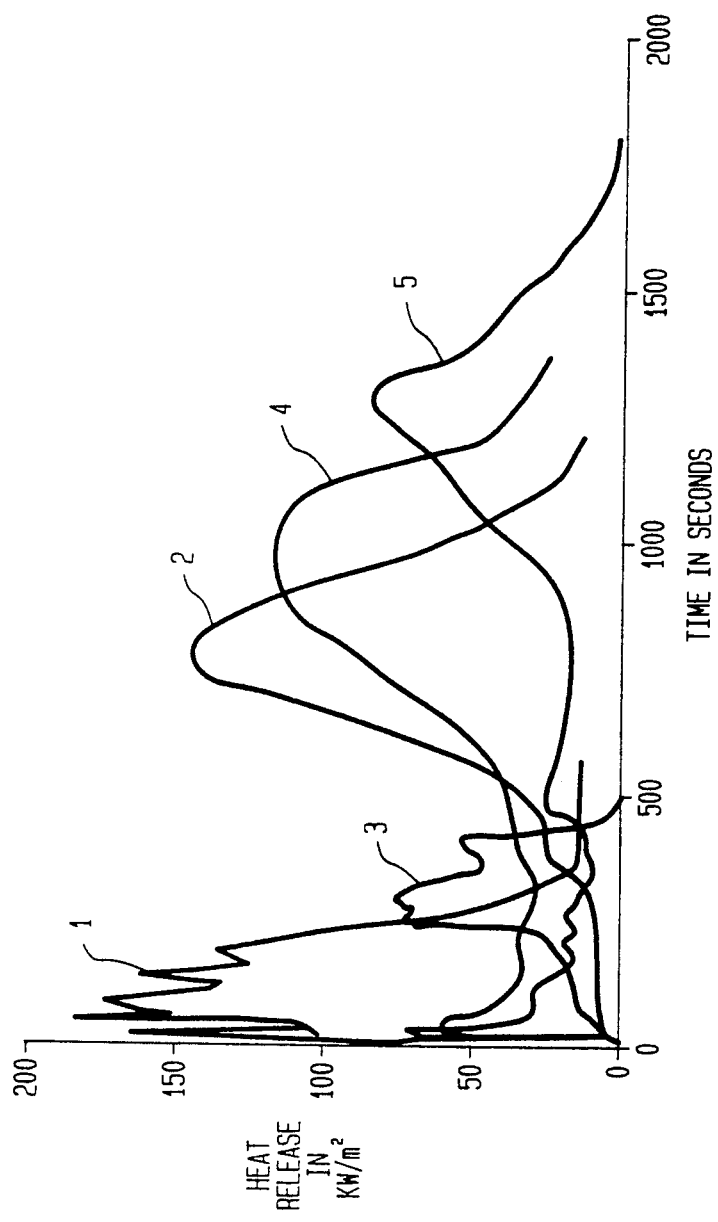
FIG. 2 is a graph of the results of testing of a fireproof barrier system for a composite structure according to the present invention in accordance with the American Society for Testing and Materials test ASTM E-1354.

In all cases, the panels were exposed to a heat flux of 75 kW/m$^2$. The results of these tests are shown in the graph of FIG. 2 where the reference numerals 1 through 5 refer to panels 1 through 5 described above. As shown in FIG. 2, one embodiment of the fireproof barrier system of the present invention (panel 4) delays not only the peak heat release rate from 100 seconds to nearly 1000 seconds, but it also reduces the maximum heat release rate from 180 to 120 kW/m$^2$ when compared with the base composite (panel 1). Another embodiment includes the addition of aluminum trihydrate (panel 5) which further delays and reduces the peak heat release to 1300 seconds (over 20 minutes) with a maximum heat release of below 100 kW/m$^2$.

The advantages of the present invention are numerous. The fireproof barrier system of the present invention provides the necessary fire protection for the composite substrate of choice while also providing surface handling and water damage protection for the system. The system further provides the necessary fire protection without a large space or volume tradeoff, as is the case with conventional fire protection insulation. The preferred embodiment ablative material may be used in thin sheets to provide the necessary fireproofing with a material flexibility that allows the fireproofing to be applied easily to complex structural shapes. The phenolic resin skin is also easily applied to complex structural shapes by conventional spraying or hand laying techniques.

Although the invention has been described relative to a specific embodiment thereof, there are numerous variations and modifications that will be readily apparent to those skilled in the art in the light of the above teachings. It is therefore to be understood that, within the scope of the appended claims, the invention may be practiced other than as specifically described.

What is claimed is:

1. A fireproof barrier system for a structure, comprising:
   a sheet of ablative material bonded onto the structure to be fireproofed; and
   a coating of phenolic resin deposited on said sheet of ablative material.

2. A fireproof barrier system as in claim 1 wherein said ablative material comprises a polyisobutylene binder with a hydrated salts ablative component mixed therein.

3. A fireproof barrier system as in claim 2 wherein said sheet of ablative material is between about 1-7 mm thick.

4. A fireproof barrier system as in claim 1 wherein said coating of phenolic resin is approximately 1-3 mm thick.

5. A fireproof barrier system as in claim 1 further comprising between about 50 to 80 parts per hundred of aluminum trihydrate mixed into said coating of phenolic resin.

6. A fireproof barrier system as in claim 1 wherein said phenolic resin is glass-reinforced.

7. A fireproof barrier system for a composite structure, comprising:
   a sheet of ablative protective material bonded onto the composite structure to be fireproofed, said sheet having a thickness between about 1-7 mm; and
   a protective skin deposited on said sheet.

8. A fireproof barrier system as in claim 7 wherein said protective skin is a phenolic resin having between about 50 to 80 parts per hundred of aluminum trihydrate mixed therein.

9. A fireproof barrier system as in claim 8 wherein said phenolic resin is glass-reinforced.

* * * * *